United States Patent
Miller et al.

(10) Patent No.: US 7,734,505 B2
(45) Date of Patent: Jun. 8, 2010

(54) METHOD AND SYSTEM FOR IMPLEMENTING AUTOMATIC AUCTION EXTENSIONS AND ADJUSTABLE BID INCREMENTS IN AN ELECTRONIC EXCHANGE

(75) Inventors: Kevin Miller, Granite Bay, CA (US); Kim Powell, Niwot, CO (US); Dave Stephens, Merced, CA (US); James Wang, Fremont, CA (US); Kareem Benjamin, San Francisco, CA (US); Ben Gu, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1557 days.

(21) Appl. No.: 09/924,671

(22) Filed: Aug. 7, 2001

(65) Prior Publication Data

US 2009/0112726 A1  Apr. 30, 2009

(51) Int. Cl.
*G06Q 30/00* (2006.01)
(52) U.S. Cl. ....................................................... 705/26
(58) Field of Classification Search .................. 705/35, 705/37
See application file for complete search history.

(56) References Cited

U.S. PATENT DOCUMENTS

| | | | |
|---|---|---|---|
| 6,006,201 A | 12/1999 | Berent et al. | |
| 6,199,050 B1 * | 3/2001 | Alaia et al. | 705/37 |
| 6,243,691 B1 | 6/2001 | Fischer et al. | |
| 6,324,520 B1 | 11/2001 | Walker et al. | |
| 6,366,891 B1 | 4/2002 | Feinberg | |
| 6,415,270 B1 | 7/2002 | Rackson et al. | |
| 6,499,018 B1 | 12/2002 | Alaia et al. | |
| 6,606,608 B1 | 8/2003 | Bezos et al. | |
| 6,704,713 B1 * | 3/2004 | Brett | 705/37 |
| 2001/0039528 A1 | 11/2001 | Atkinson et al. | |
| 2001/0042039 A1 | 11/2001 | Rupp et al. | |

(Continued)

OTHER PUBLICATIONS

Ebay Help, Basics—Frequently Asked Questions on Bidding; Feb. 29, 2000, found on www.archive.org; pp. 1-5.*

(Continued)

*Primary Examiner*—Jason M Borlinghaus
(74) *Attorney, Agent, or Firm*—Townsend and Townsend and Crew, LLP

(57) ABSTRACT

A method for automatic auction extension and user controlled standardized bid increment/decrement. The method is implemented in an electronic commerce exchange. The auction method implements automatic extension of an auction in response to bidding activity from auction participants. The method includes the step of setting an end time for concluding the auction. Bids are received from remote bidders via a distributed computer network. The received bids are analyzed to determine whether a predetermined number of bids are received within a predetermined time of the auction end time. If a greater number of bids are received within the predetermined time, the duration of the auction is automatically extended and a new auction end time is set. The auction participants are notified of the new auction end time. Standardized bid increments can be set defining a minimum amount at which a subsequent bid differs from a previous bid. Similarly, standardized bid decrements can be set defining a minimum amount at which a subsequent bid subsequent bid differs from a previous bid. A total number of possible extensions can be set defining a number of times the auction can be extended due to bidding activity. The settings can be changed dynamically during the auction by the auction operator/user.

18 Claims, 5 Drawing Sheets

U.S. PATENT DOCUMENTS

| | | | |
|---|---|---|---|
| 2001/0044751 | A1 | 11/2001 | Pugliese et al. |
| 2002/0007338 | A1* | 1/2002 | Do .............................. 705/37 |
| 2002/0026391 | A1 | 2/2002 | Laster et al. |
| 2002/0103721 | A1 | 8/2002 | Wiesehuegel et al. |
| 2002/0147666 | A1 | 10/2002 | Baseman et al. |
| 2003/0093355 | A1 | 5/2003 | Issa |
| 2003/0158804 | A1 | 8/2003 | Francis et al. |

OTHER PUBLICATIONS

U.S. Appl. No. 09/912,891, filed Jul. 24, 2001, Non-Final Office Action dated Nov. 19, 2003, 6 pgs.

U.S. Appl. No. 09/912,891, filed Jul. 24, 2001, Non-Final Office Action dated May 11, 2004, 9 pgs.

U.S. Appl. No. 09/912,891, filed Jul. 24, 2001, Non-Final Office Action dated Nov. 15, 2004, 9 pgs.

U.S. Appl. No. 09/912,891, filed Jul. 24, 2001, Final Office Action dated Jul. 13, 2005, 9 pgs.

U.S. Appl. No. 09/912,891, filed Jul. 24, 2001, Non-Final Office Action dated Mar. 9, 2006, 7 pgs.

U.S. Appl. No. 09/912,891, filed Jul. 24, 2001, Non-Final Miscellaneous Office Action with SSP dated Aug. 28, 2006, 3 pgs.

U.S. Appl. No. 09/912,891, filed Jul. 24, 2001, Non-Final Office Action dated Dec. 13, 2006, 7 pgs.

U.S. Appl. No. 09/912,891, filed Jul. 24, 2001, Final Office Action dated Jun. 14, 2007, 9 pgs.

U.S. Appl. No. 09/912,891, filed Jul. 24, 2001, Non-Final Office Action dated Nov. 28, 2007, 9 pgs.

U.S. Appl. No. 09/912,891, filed Jul. 24, 2001, Final Office Action dated Jun. 26, 2008, 13 pgs.

U.S. Appl. No. 09/912,891, filed Jul. 24, 2001, Non-Final Office Action dated Dec. 10, 2008, 13 pgs.

U.S. Appl. No. 09/912,891, Filed Jul. 24, 2001, Final Office Action dated Jun. 23, 2009, 17 pgs.

* cited by examiner

METHOD AND SYSTEM FOR IMPLEMENTING AUTOMATIC AUCTION EXTENSIONS AND ADJUSTABLE BID INCREMENTS IN AN ELECTRONIC EXCHANGE

FIELD OF THE INVENTION

The field of the present invention pertains to efficient implementation and management of electronic commerce buying and selling operations on a distributed computer network. More particularly, the present invention relates to a method and system for implementing user adjustable bidding increment control in electronic commerce buying and selling operations.

BACKGROUND OF THE INVENTION

Buyers and sellers use a variety of techniques to ensure goods and services meet their mutual expectations. However, traditional procurement systems have been proven to be error prone, labor intensive, and costly operations. For example, often times, when a buyer is looking to purchase a batch of articles, a buyer might negotiate terms for the purchase prior to making the purchasing decision. The negotiation allows the buyer and seller to ensure the articles and terms (e.g., price, quantity, delivery conditions, etc.) will meet any specific requirements. As is generally known, it is advantageous to consider many alternative buyers/sellers when negotiating terms. A larger number of buyers and sellers available, for example, to bid on articles of manufacture, usually leads to a more efficient matching of requirements between buyers and sellers (e.g., getting the best deal). Traditional buying and selling mediums, such as auctions, catalog based purchasing, and selling, and the like, do not always facilitate the most efficient matching of requirements. Alternatively, when prior inspection of an article is not possible or practical, the seller may provide the buyer with specifications describing the properties of the articles. The recent ascendancy of electronic commerce provides a means of avoiding, or at least reducing, the problems presented by the use of traditional buying and selling mediums.

In many respects, the Internet and the World Wide Web based network technologies have largely eliminated the most labor intensive and costly portions of the buying and selling type commerce operations (e.g., the use of mass mailings, printed specifications, catalogs, updating preprinted product information, etc.). However, many of the old problems still remain. For example, the fact that a buyer may find a seller from whom to purchase a batch of articles "on-line", does not change the fact that the buyer might not be aware of a more favorable purchase opportunity from a different seller prior to making the purchasing decision. Even when negotiation and/or inspection of all articles from all possible sellers is not practical, the buyer would find very helpful a comprehensive system for gathering offers from a large, widely distributed number of sellers.

To avoid these problems, a variety of electronic commerce facilitating schemes were developed. One such scheme involved the use of business-to-business buying and selling exchanges implemented on the Internet. The term "electronic commerce" or "e-commerce" originally evolved from remote forms of electronic shopping to mean all aspects of business and market processes enabled by wide area communications networks, namely, the Internet and the World Wide Web based network technologies. E-commerce is a rapidly growing field, and is generally understood to mean doing business on-line or selling and buying products and services through Web (e.g., Internet based) storefronts or through other similar distributed computer networks. In general, electronic commerce is substantially similar to the more traditional catalog based commerce schemes. The business-to-business e-commerce exchanges, or simply "B2B exchanges" have evolved to focus on the specific needs and requirements of buying and selling between businesses.

As the use of B2B exchanges has proliferated, the implementation of electronic commerce auctions has become increasingly common. The use of electronic commerce facilitated auctions, or simply electronic auctions, has become a preferred method of efficiently matching buyers and sellers of goods and services. Electronic auctions provide a convenient means for aggregating large numbers of buyers or sellers and efficiently disseminating market information among them.

Auctions are different from traditional catalog based commerce schemes. Auctions generally aggregate buyers or sellers to purchase or sell items/services through the respective submission of competitive bids. Generally, the most competitive bid is designated the winner of the auction. For example, in an auction amongst multiple competing buyers, the most competitive bid is usually the bid offering the most money for the specified item or service. In an auction amongst multiple competing sellers, the most competitive bid is usually the bid offering the specified item or service for the lowest price.

Thus, buyers and sellers participating in an auction compete with one another on the basis of the terms of their bids. Auctioneers have an interest in making the bidding process as competitive as possible to effect the most efficient matching of requirements between sellers and buyers (e.g., getting the best deal). Large numbers of buyers or sellers competitively trying to outbid one another usually leads to the most favorable terms.

Buyers and sellers have an interest in ascertaining the competitiveness of their respective bids with respect to the conditions/rules of a given auction. For example, in a highly competitive auction for the purchase of a specified item (e.g., a batch of automobile parts), many competing bids are submitted from the various competing buyers. The auction has specified time limits. The auction begins at a specified time and ends at a specified time. Theses times can be specified by the seller. The buyers try to win the auction on the basis of the relative competitiveness of their respective bid. The buyers may try to judge interest in the specified good or service in order to determine the parameters of a new bid. Generally, buyers attempt to win the auction for the good or service without excessively overbidding. The sellers try to encourage the auction, soliciting successive bids from the buyers, with each bid being "better" for the seller than the previous bid. Generally, sellers attempt to encourage new bids from the buyers that are significantly better than previous bids. If the auction is highly competitive, the status of the bids for the specified item, as they are made, is important information regarding respective chances of a particular buyer being designated the winner of the auction. For example, buyers may judge the end time of the auction with respect to the competitiveness of the auction, attempting to make a final winning bid just before the conclusion.

There is a problem, however, in that the use of electronic commerce facilitated auctions creates problems for the buyers and sellers with respect to tracking the status of the bidding process. Electronic commerce is generally enabled by wide area communications networks, namely, the Internet and the World Wide Web based network technologies. As such, for example, auction participants are typically coupled to the auction event (e.g., exchange, etc.) via a web browser client communicating with auction event servers over the Internet. As is common with Internet and World Wide Web based technologies, there exists a significant amount of lag in two way communication between the electronic commerce exchange hosting the auction and the buyer's web browser. For example, as new bids are entered, an auction participant determines the status her respective bid by hitting "refresh" in the browser GUI to query the exchange server for the status of all the bids. This is often the only way a winning bidder can ensure he/she is still in possession of the winning bid. There is a certain amount of lag in the bid update process attributable to the Internet and World Wide Web network technologies.

Hence, buyers often take advantage of the lag due to the Internet and World Wide Web technologies by making frivolous bids in an attempt to win the auction by as small an amount as possible over competing buyers. For example, at times near the end of the auction, a buyer might continuously submit new bids, each bid being slightly higher than the previous high bid, in an attempt to take advantage of the lag. The buyer can steal the auction from genuine bidders by concealing interest until the closing moments of the auction since, due to the lag, the status of the bids is not efficiently disseminated to all auction participants. This leads to a large degree of uncertainty at the end of the auction as to which of the auction participants has won the auction. For example, several participants might believe they are in possession of the winning bid only to find that at some instant prior to the close of the auction they were outbid by some frivolous amount (e.g., one dollar). The seller has no means of ascertaining the emergence of such frivolous bidders since the winner of the auction is usually determined by the high bid at the expiration of the allotted time.

Another problem is the fact that the seller cannot alter terms of the auction dynamically as the auction is under way. Arbitrarily changing parameters of the auction after the start of the auction risks confusion among the buyers. Although a seemingly sufficient amount of time may be allocated (e.g., several days), the seller often finds that serious bids and serious competition only emerges in the closing moments of the auction.

Thus, what is required is a solution for controlling frivolous bidding activity. The required solution should be user configurable in accordance with the circumstances of the auction and the particular requirements of the user. The required solution should reduce the inefficiencies associated with lag. What is further required is a solution for dynamically altering the terms of the auction without risk of confusion to the auction participants. Additionally, the required solution should be compatible with widely used electronic commerce enabling technology. The present invention provides a novel solution to the above requirements.

SUMMARY OF THE INVENTION

The present invention provides a solution for controlling frivolous bidding activity. The present invention is user configurable in accordance with the circumstances of the auction and the particular requirements of the user. The present invention reduces the inefficiencies associated with lag. The present invention provides a method and system for dynamically altering the terms of the auction without risk of confusion to the auction participants. Additionally, the present invention is compatible with widely used electronic commerce enabling technology.

In one embodiment, the present invention is implemented as a method for automatic auction extension and user controlled standardized bid increment/decrement within auctions hosted on an electronic commerce exchange. The auction method implements automatic extension of an auction in response to bidding activity from auction participants. The method includes the step of setting an end time for concluding the auction. Bids are received from remote bidders via a distributed computer network. The received bids are analyzed to determine whether a predetermined number of bids are received within a predetermined time of the auction end time. If a greater number of bids are received within the predetermined time, the duration of the auction is automatically extended and a new auction end time is set.

The auction participants are notified of the new auction end time, thereby eliminating any confusion regarding the conditions of the auction. Standardized bid increments can be set defining a minimum amount at which a subsequent bid differs from a previous bid. Similarly, standardized bid decrements can be set defining a minimum amount at which a subsequent bid differs from a previous bid. A total number of possible extensions can be set defining a number of times the auction can be extended due to bidding activity. The settings can be changed dynamically during the auction by the auction operator/user. In each case, the auction participants are notified via the distributed computer network of any new or changed settings of the auction.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Figure 1:
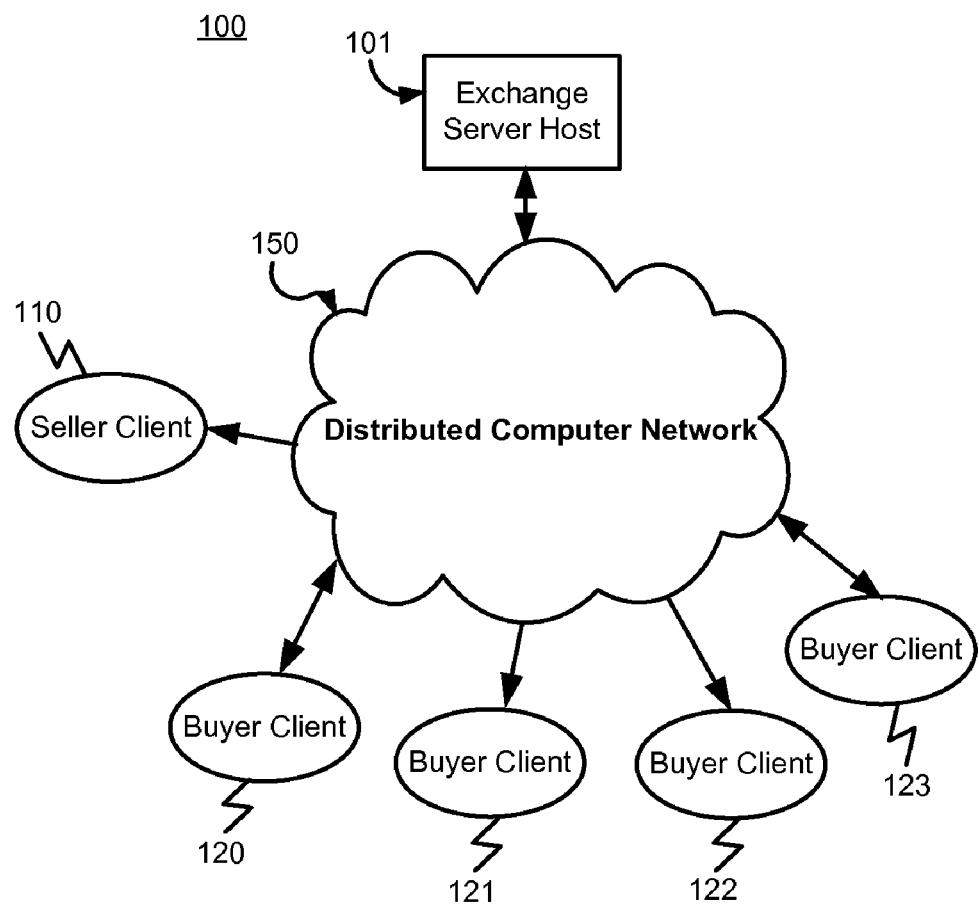
FIG. 1 shows a diagram of an electronic commerce auction operation in accordance with one embodiment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention is a method and system for automatic auction extension and user controlled standardized bid increment/decrement within auctions hosted on an electronic commerce exchange. The present invention provides a solution for controlling frivolous bidding activity. The present invention is user configurable in accordance with the circumstances of the auction and the particular requirements of the user. The present invention reduces the inefficiencies associated with lag. The present invention provides a method and system for dynamically altering the terms of the auction without risk of confusion to the auction participants. Additionally, the present invention is compatible with widely used electronic commerce enabling technology. The present invention and its benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "communicating" or "instantiating" or "registering" or "displaying" or the like, refer to the action and processes of a computer system (e.g., computer system 512 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

Referring now to FIG. 1, a diagram of an electronic exchange auction system 100 in accordance with one embodiment of the present invention is shown. As depicted in FIG. 1, system 100 includes an exchange server host 101 communicatively coupled to a seller client 110 and a plurality of buyer clients 120-123 via a distributed computer network 150.

The exchange server host 101 functions as the central communications point for the auction operations, by conducting data collection and management of product information (e.g., items, services, or the like) provided by seller clients, such as seller client 110, and auction bid information provided by the buyer clients 120-123. Seller client 110 and buyer clients 120-123 communicate with exchange server host 101 via the communications protocols of distributed computer network 150, hereafter simply network 150.

Exchange server host 101 conducts the auction operations on the basis of a comparison of the competing bid information from buyer clients 120-123.

A typical auction operation comprises buyer clients 120-123 accessing product information stored on exchange server host 101 by seller client 110 and submitting successive competing bids to exchange server host 101 for the product. The bids are transmitted from buyer clients 120-123 to exchange server host 101 via network 150. Similarly, the product information is provided to exchange server host 101 by seller client 110 via network 150.

The comparison of the competing bids submitted by buyer clients 120-123 is performed by exchange server host 101. Exchange server host 101 is configured to continuously receive and compare incoming bids and determine therefrom a bid status. The bid status includes information regarding the most competitive bid out of the bids received for the product, total number of bids received, any associated terms for the bids, and the like. In one embodiment, the bid status can be updated with each incoming new bid. At the conclusion of the auction, the bid status reveals the most competitive bid submitted and thus reveals the winner of the auction.

Referring still to FIG. 1, in accordance with the present embodiment, exchange server host 101 implements the method for automatic auction extension and user controlled standardized bid increment/decrement within auctions hosted on electronic exchange auction system 100. The auction method implemented by exchange host server 100 implements automatic extension of an auction in response to bidding activity from auction participants, e.g., buyer clients 120-123. The method includes the step of setting an end time for concluding the auction. Bids are received from remote bidders via a distributed computer network, with exchange server host 101 continuously receiving and comparing incoming bids and updating the bid status, as described above.

As the auction progresses towards the designated end time, exchange server host 101 analyzes two factors to determine whether the auction is to be extended. The incoming bids are analyzed to determine whether a predetermined number of bids (the first factor) are received within a predetermined time (the second factor) of the auction end time. In other words, the incoming bids are analyzed to determine whether they are arriving at a rate that exceeds a certain threshold. For example, if a large number of bids are being received during the last 5 minutes of an auction, the auction can be automatically extended for an additional period of time to allow the auction participants to continue bidding.

The number of bids arriving during the predetermined time (e.g., the last 5 minutes of the auction) required to exceed the threshold is user adjustable. Similarly, the predetermined period of time during which the arrival rate of new bids is assessed (e.g., the last 5 minutes or the last 1 hour of the auction, or the like) is also user adjustable. These factors allow the user to set parameters for the exchange server host to automatically assess bidding activity and determine whether an auction extension is warranted. In this example, if a greater number of bids are received within the predetermined 5 minute time period prior to the end of the auction, the duration of the auction is automatically extended and a new auction end time is set. The auction participants (e.g., buyer clients 120-123) are automatically notified of the new auction end time by exchange server host 101, thereby eliminating any confusion regarding the conditions of the auction.

Standardized bid increments can be set defining a minimum amount at which a subsequent bid differs from a previous bid. Similarly, standardized bid decrements can be set defining a minimum amount at which a subsequent bid differs from a previous bid. The standardized minimum increments/decrements are used to control any frivolous bidding activity.

A total number of possible extensions can be set defining a number of times the auction can be extended due to bidding activity. The number of possible extensions is entered by, for example, the auction operator/user (e.g., seller client 110) into exchange server host 101. Accordingly, even though bidding activity may dictate an additional number of automatic auction extensions, the number of possible extensions setting limits the total number of times the auction can be extended, thereby ensuring the auction cannot be prolonged past some specified period.

The settings for conducting the auction in accordance with the present embodiment can be changed dynamically during the auction by the auction operator/user (e.g., seller client 110). In each case, the auction participants are notified via the distributed computer network of any new or changed settings of the auction. These updates and other auction related information can be transmitted to the auction participants with, for example, the bid status updates.

Referring still to FIG. 1, as described above, exchange server host 101 is configured to communicate with buyer clients 120-123 to disseminate auction related information. Such information can include, for example, bid status refresh and item attribute updates. Automatic bid status refresh provides updated bid status (e.g., information regarding the most competitive bid, total number of bids received, any associated bid terms, and/or the like) to each of the buyer clients 120-123, enabling each of buyer clients 120-123 to track the status of the bidding process as the auction operation unfolds. For example, as new bids are entered and received by exchange server host 101, the updated bid status is sent to buyer clients 120-123, allowing the auction participants to track the status of their respective bids and ascertain the competitiveness of their most recent bids. Additionally, since more complex auctions can involve competition on many terms other than price, attributes such as delivery conditions, special item features, volume discounts, and the like can also be included in the bid status updates sent to buyer clients 120-123.

It should be noted that in some embodiments, specifications for items for the auction can be changed dynamically as the auction is conducted. Any such changes are disseminated to the remote bidders via the distributed computer network (e.g., in accordance with a user configured update schedule). This aspect allows, for example, a seller to alter the items of the auction operation dynamically based upon the activity level or number of incoming bids being received. Where unsatisfactory interest is evidenced, the specification for the items can be altered to provoke additional bidding.

It should be noted that the embodiment of the present invention depicted in FIG. 1 (e.g., system 100) is implemented as a software based process cooperatively executing on the respective computer system platforms of both exchange server host 101 and buyer clients 120-123. The basic components of the computer system platforms are shown in the example computer system 512 of FIG. 5 below. To provide the product information and bid status updates simultaneously to a large umber of other systems and to accept the incoming bids, it is desirable implement exchange server host 101 as a high speed, large capacity computer system platform such as, for example, a powerful multi-processor server.

Referring still to FIG. 1, network 150 includes well known network technologies. For example, network 150 can be implemented using LAN technologies (e.g., Ethernet, Token-ring, etc.), the Internet, or other wired or wireless network technologies. The communications links between exchange server host 101, seller client 110, buyer clients 120-123 and network 150 can be implemented using, for example, a telephone circuit, communications cable, optical cable, wireless link, or the like.

Figure 2:
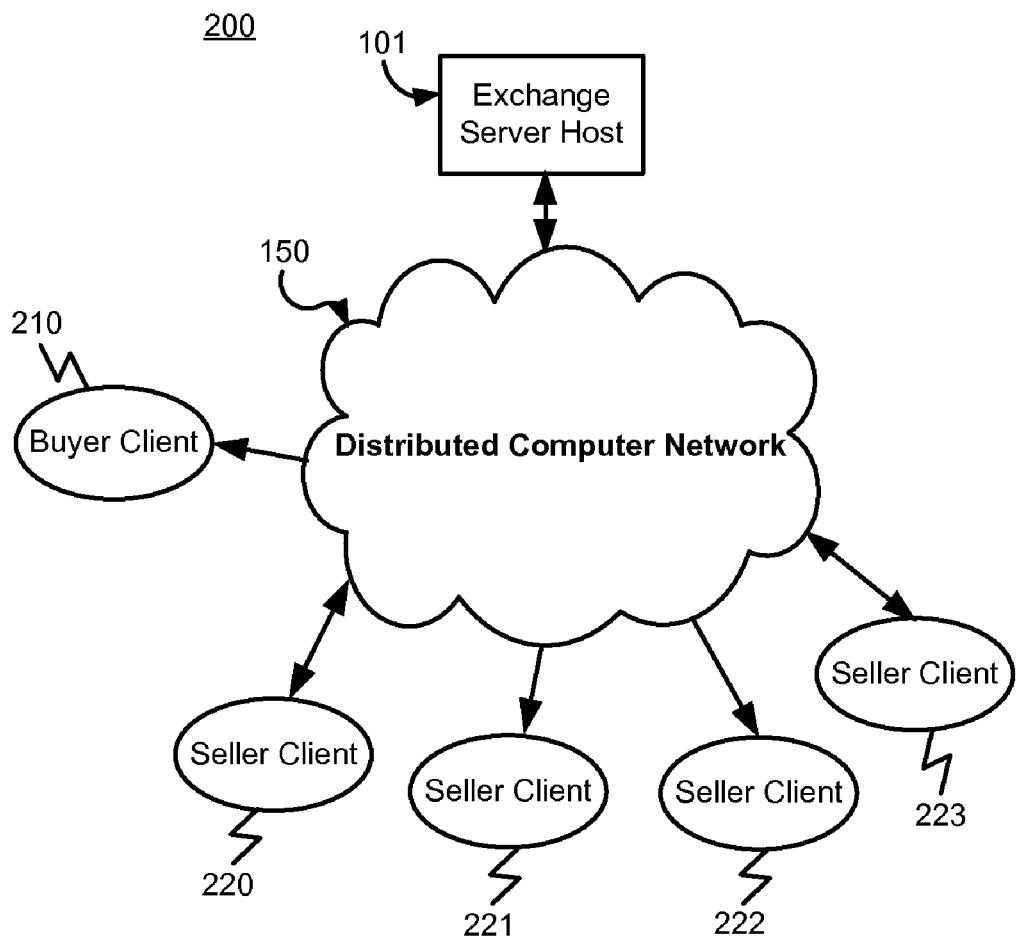
FIG. 2 shows a diagram of an electronic commerce auction operation in accordance with an alternative embodiment of the present invention.

FIG. 2 shows a system 200 in accordance with an alternative embodiment of the present invention. System 200 is substantially similar to system 100 of FIG. 1, however, system 200 depicts an auction operation wherein competing seller clients bid to sell products or services to a buyer client 210.

The auction operation depicted in FIG. 2 comprises seller clients 220-223 accessing product information stored on exchange server host 101 by buyer client 210 and submitting successive competing bids to exchange server host 101 in order to sell the specified product or service to buyer client 210. In a manner similar to system 100 of FIG. 1, the bids are transmitted from seller clients 220-223 to exchange host server 101 via network 150, and the product information is provided to exchange server host 101 by buyer client 210 via network 150. Auction operations in accordance with system 200 are at times referred to as "reverse auctions" where sellers submit competing bids to sell specified products and/or services to a buyer.

The comparison of the competing bids submitted by seller clients 220-223 is performed by exchange server host 101. Exchange server host 101 is adapted to continuously receive and compare incoming bids, determine therefrom a bid status, and disseminate this bid status to all auction participants. The bid status includes information regarding the most competitive bid out of the bids received for the product, total number of bids received, any associated terms for the bids, and the like, and can be updated with each incoming new bid.

In a manner similar to system 100 of FIG. 1, in system 200, as the auction progresses towards the designated end time, exchange server host 101 analyzes the incoming bids to determine whether a predetermined number of bids are received within a predetermined time of the auction end time to determine whether to automatically extend the auction for an additional period of time. The auction participants (e.g., seller clients 220-223) are automatically notified of the new auction end time by exchange server host 101. Standardized bid increments or decrements can be set defining a minimum amount at which a subsequent bid differs from a previous bid. A total number of possible extensions can be set defining a number of times the auction can be extended due to bidding activity.

As with system 100 of FIG. 1, the exchange server host 101 can be configured to communicate with seller clients 220-223 to implement any required automatic bid status refresh and item attribute updates. Automatic bid status refresh provides updated bid status to each of the auction participants, allowing each of them to track the status of the bidding process, track the status of their respective bids, and ascertain the competitiveness of their most recent bids as the auction operation unfolds.

Figure 3:
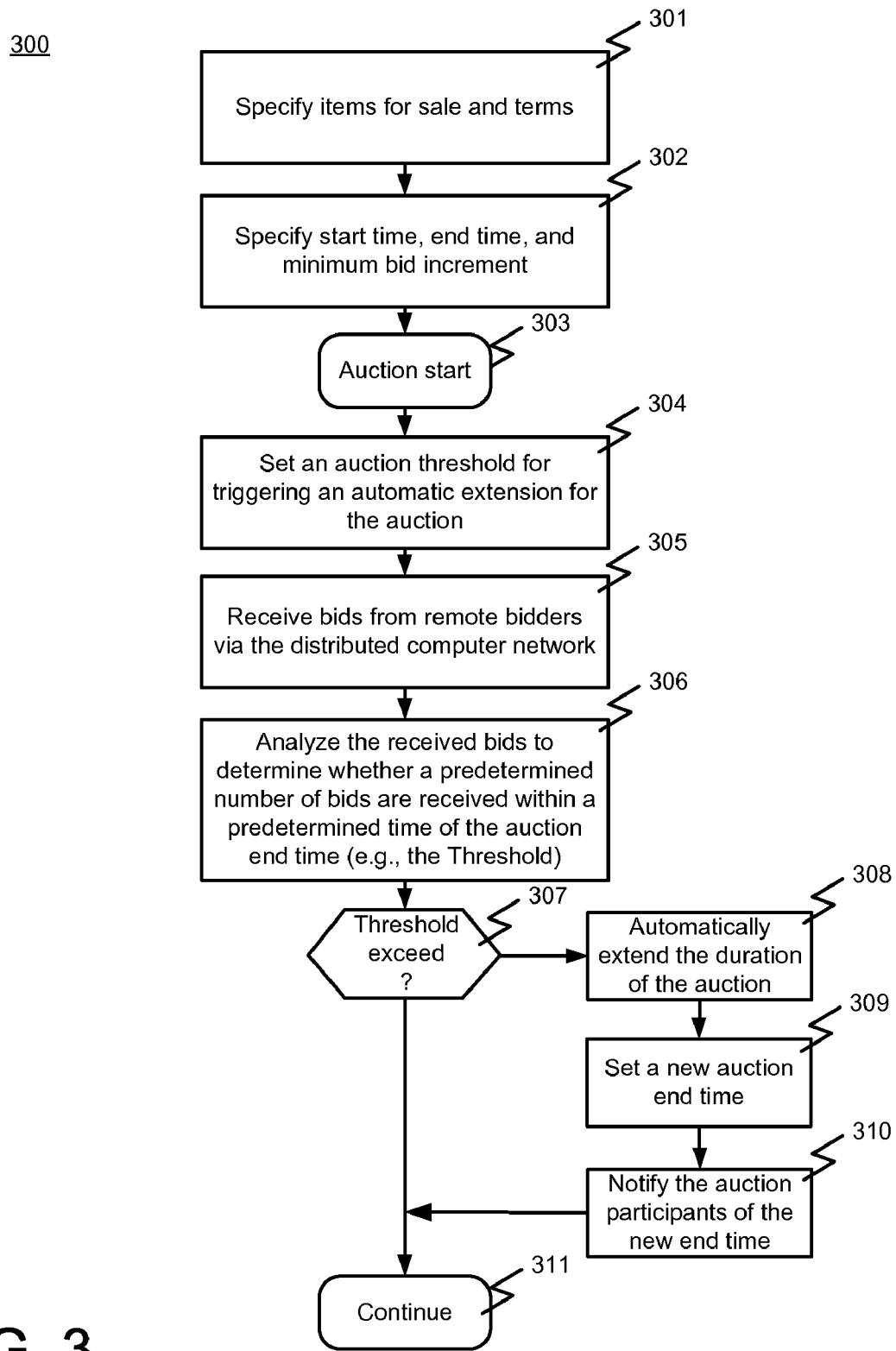
FIG. 3 shows a flowchart of the steps of a process in accordance with one embodiment of the present invention.

With reference now to FIG. 3, a flow chart of the steps of a process 300 in accordance with one embodiment of the present invention is shown. As depicted in FIG. 3, process 300 diagrams the operating steps of an automatic auction extension process as performed by, for example, system 100 of FIG. 1, as a seller auctions an item to multiple competing buyers.

Process 300 begins in step 301, where a seller (e.g., seller client 110 of FIG. 1) specifies one or more items for sale and the terms of the sale. The terms of the sale can include, for example, delivery conditions, packaging conditions, and the like. The items for sale can be, for example, a single item (e.g., a diesel engine) or a batch or lot of items (e.g., 200 crates of automobile tires).

In step 302, the start time and the end time the auction are specified along with other initial conditions. Such conditions can include, for example, enumeration of the authorized bidders, the minimum opening bid, a reserve (if any), and the like. The start time, end time, and initial auction conditions are used by the exchange server host (e.g., exchange server host 101) to set up the parameters of the auction operation. Subsequently, in step 303, the auction begins.

In step 304, an auction threshold for triggering an automatic extension of the auction is set by the user (e.g., the seller client 110). As described above, as the auction progresses towards the initial end time, exchange server host 101 analyzes two factors to determine whether the auction is to be extended. The incoming bids are analyzed to determine whether a predetermined number of bids (the first factor) are received within a predetermined time (the second factor) of the auction end time. In other words, the incoming bids are analyzed to determine whether they are arriving at a rate that exceeds a certain threshold. In this embodiment, the auction threshold is set after the auction begins, wherein the seller assesses the competitiveness of the auction and the bidding patterns of the competing buyers. Alternatively, the threshold can be set prior to the beginning of the auction (e.g., in step 302).

In step 305, the exchange server host 101 receives bids from the auction participants (e.g., the remote bidders, buyer clients 120-123) as the auction operation proceeds. In step 305, as the bids are received, the exchange server host 101 continuously determines a bid status. As described above, this bid status is used to track the status of the bids as they are received and determine the most competitive, or winning, bid.

In step 306, the received bids are analyzed to determine whether a predetermined number of bids are received within a predetermined time of the auction end time as specified by the threshold determined in step 304. As described above, the incoming bids are analyzed to determine whether they are arriving at a rate that exceeds the threshold. For example, if a large number of bids are being received during the last 5 minutes of an auction, the threshold is exceeded, indicating the need for an extension for an additional period of time to allow the auction participants to continue bidding.

In step 307, if a larger number of bids are received within a predetermined time, process 300 proceeds to step 308, where the auction is automatically extended for an additional period time. In step 309, a new auction end time is set, and in step 310, the auction participants are notified of the new auction end time. Subsequently, in step 311, the auction continues. If, in step 307, the threshold is not exceeded, the auction proceeds normally, as specified by the initial conditions set in steps 301 and 302, with the exchange server host 101 accepting new bids from the auction participants.

Figure 4:
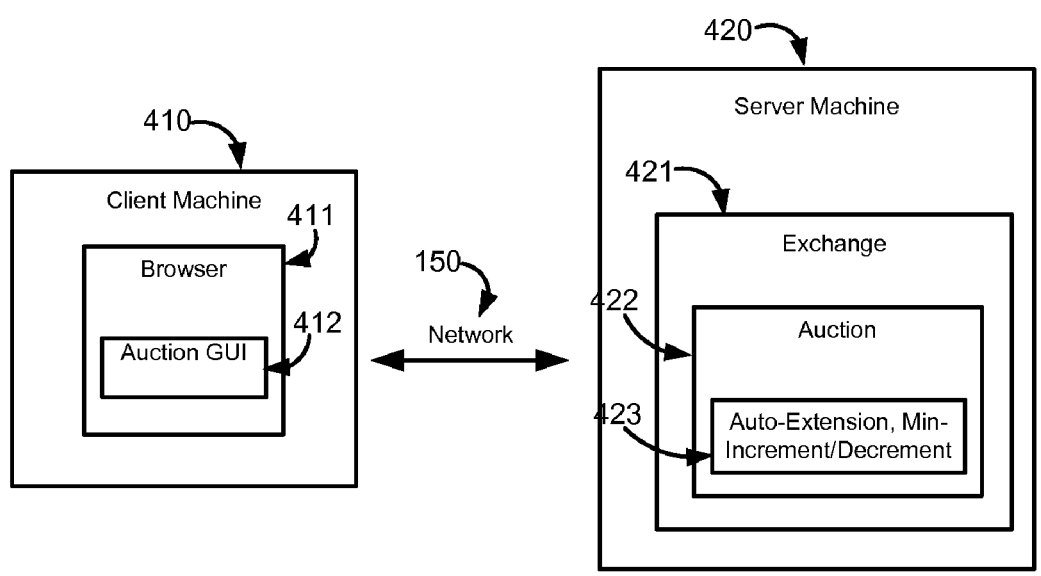
FIG. 4 shows a diagram of the software based components of a system in accordance with one embodiment of the present invention.

FIG. 4 shows a diagram of the relationship between the software components executing on a client computer system platform, client machine 410, and the software components executing on a server computer system platform, server machine 420, in accordance with one embodiment of the present invention.

As depicted in FIG. 4, a client machine 410 executes a browser 411. As is well known, browser 411 functions as a client for browsing World Wide Web, or compatible networks. Browser 411 is configured to receive information from servers on network 150, such as a server 420, and to interpret and display the information graphically to a user. Browser 411 interprets HTML commands received from server 420 to display text and images within a graphical user interface (GUI). The GUI is customized to show components (e.g., text, images, buttons, fields, etc.) in accordance with the HTML information received from server 420. Using the HTML information, browser 411 implements an auction GUI 412 to provide an intuitive means for input and output with a user.

Server 420 functions as the exchange server host for the auction operations. Server 420 instantiates an exchange 421 which functions as an E-commerce site on the network 150. Exchange 421 is implemented, for example, by using a database program running on server machine 420. Exchange 421 implements one or more hosted auctions 422 to facilitate the buying and selling of goods and services. An auction in accordance with the present invention includes an auction extension and minimum bid increment/decrement component 423 for implementing the automatic auction extension and user controlled standardized bid increment/decrement functionality within the hosted auctions (e.g., Auction 422). As described above, the minimum bid increment/decrement, the threshold for triggering an automatic extension, the duration of the extension, total number of extensions allowed, and the like, can be altered dynamically by the seller via communication between the seller's client machine (e.g., client machine 410) and the exchange server host (e.g., server machine 420). Any dynamically implemented changes to the auction conditions can be automatically sent to all auction participants, to eliminate the risks of undue confusion among the participants.

Thus the present invention provides a method and system for automatic auction extension and user controlled standardized bid increment/decrement within auctions hosted on an electronic commerce exchange. The present invention provides a solution for controlling frivolous bidding activity. The present invention is user configurable in accordance with the circumstances of the auction and the particular requirements of the user. The present invention reduces the inefficiencies associated with lag. The present invention provides a method and system for dynamically altering the terms of the auction without risk of confusion to the auction participants. Additionally, the present invention is compatible with widely used electronic commerce enabling technology. The present invention and its benefits are further described below.

Computer System Platform

Figure 5:
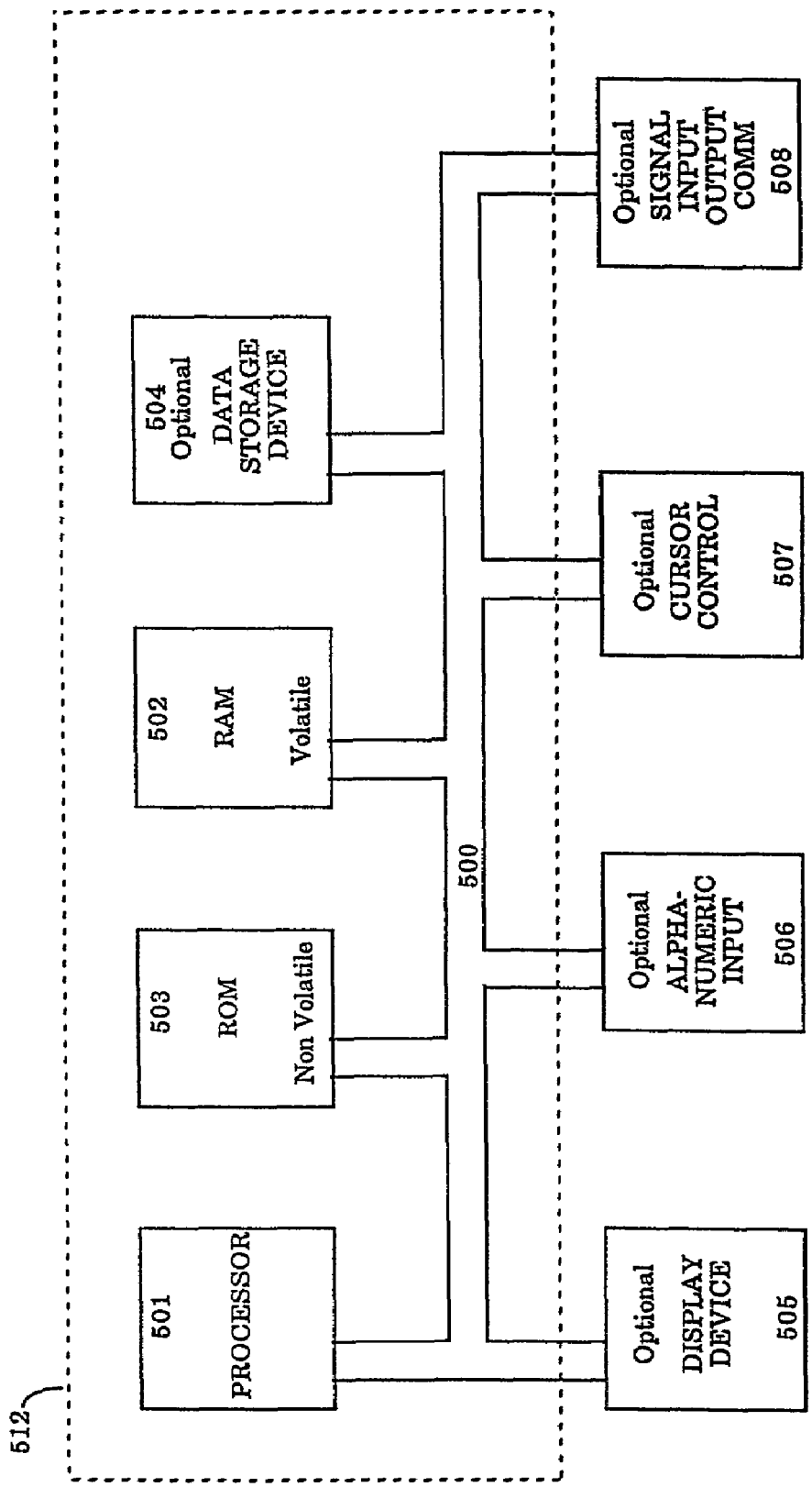
FIG. 5 shows the components of a computer system platform in accordance with one embodiment of the present invention.

With reference now to FIG. 5, a computer system 512 in accordance with one embodiment of the present invention is shown. Computer system 512 shows the components of a computer system in accordance with one embodiment of the present invention that provides the execution platform for implementing certain software based functionality of the present invention. As described above, certain processes and steps of the present invention are realized, in one embodiment, as a series of instructions (e.g., software program) that reside within computer readable memory units of a computer system (e.g., system 512) and are executed by the processor(s) of system 512. When executed, the instructions cause the computer system 512 to implement the functionality of the present invention as described above.

In general, computer system 512 shows the basic components of a computer system used to implement "server" machines and "client" machines. Computer system 512 comprises an address/data bus 500 for communicating information, one or more central processors 501 coupled with the bus 500 for processing information and instructions, a computer readable volatile memory unit 502 (e.g., random access memory, static RAM, dynamic, RAM, etc.) coupled with the bus 500 for storing information and instructions for the central processor(s) 501, a computer readable non-volatile memory unit 503 (e.g., read only memory, programmable ROM, flash memory, EPROM, EEPROM, etc.) coupled with the bus 500 for storing static information and instructions for the processor(s) 501. System 512 also includes a mass storage computer readable data storage device 504 such as a magnetic or optical disk and disk drive coupled with the bus 500 for storing information and instructions. Optionally, system 512 can include a display device 505 coupled to the bus 500 for displaying information to the computer user, an alphanumeric input device 506 including alphanumeric and function keys coupled to the bus 500 for communicating information and command selections to the central processor(s) 501, a cursor control device 507 coupled to the bus for communicating user input information and command selections to the central processor(s) 501, and a signal generating device 508 coupled to the bus 500 for communicating command selections to the processor(s) 501.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In an electronic commerce exchange server, an auction method for implementing automatic extension of an auction in response to bidding activity from auction participants, comprising:
    setting with the exchange server an end time for concluding an auction, minimum bid threshold for postponing the end time for concluding the auction, and a number of extensions allowed, the minimum bid threshold representing a total number of a plurality of bids that must be received within a predetermined time of the auction end time;
    receiving bids from remote bidders at the exchange server via a distributed computing network;
    dynamically updating the minimum bid threshold with the exchange server as the auction is conducted and based on a number of bids received from the remote bidders;
    measuring with the exchange server a number of bids received within the predetermined time of the auction end time;
    in response to the measured number of bids exceeding the minimum bid threshold and a number of extensions not exceeding the maximum number of extensions allowed, extending a duration of the auction automatically with the exchange server and setting a new auction end time with the exchange server; and
    notifying auction participants of the new auction end time with the exchange server.

2. The method of claim 1 further comprising setting with the exchange server a start time of the auction.

3. The method of claim 1 wherein the minimum bid threshold is user defined.

4. The method of claim 1 wherein the predetermined time is user defined.

5. The method of claim 1 wherein a duration of the extension from the new auction end time is user defined.

6. The method of claim 1 further comprising extending with the exchange server the duration of the auction a plurality of times where the greater number of bids are received within the predetermined time respectively.

7. The method of claim 1 further comprising setting with the exchange server a minimum bid difference at which a succeeding bid must differ from a preceding bid from the remote bidders.

8. In an electronic commerce exchange server, an auction method for implementing dynamic automatic extension of an auction in response to bidding activity from auction participants, said method comprising:
    setting with the exchange server a start time and an end time for an auction, a minimum bid threshold for postponing the end time for concluding the auction, and a number of extensions allowed, the minimum bid threshold representing a total number of a plurality of bids that must be received within a predetermined time of the auction end time;
    receiving bids from remote bidders at the exchange server via a distributed computing network;
    dynamically updating the minimum bid threshold with the exchange server as the auction is conducted and based on a number of bids received from the remote bidders;
    setting with the exchange server a minimum bid difference at which a succeeding bid must differ from a preceding bid from the remote bidders;
    measuring with the exchange server a number of bids received within a predetermined time of the auction end time;
    in response to the measured number of bids exceeding the minimum bid threshold and a number of extensions not exceeding the maximum number of extensions allowed, extending a duration of the auction automatically with the exchange server and setting a new auction end time with the exchange server; and
    notifying auction participants of the new auction end time with the exchange server.

9. The method of claim 8 wherein the minimum bid threshold is altered dynamically after the start time of the auction.

10. The method of claim 8 wherein the predetermined time is altered dynamically after the staff time of the auction.

11. The method of claim 8 wherein a duration of the extension from the new auction end time is altered dynamically after the start time of the auction.

12. The method of claim 8 further comprising extending the duration of the auction with the exchange server a plurality of times where the greater number of bids are received within the predetermined time respectively.

13. The method of claim 1, wherein said minimum bid threshold is dynamically adjustable during said auction.

14. The method of claim 8, wherein said minimum bid threshold is dynamically adjustable during said auction.

15. A method of automatically extending an auction, said method comprising:
    setting with an exchange server an end time for concluding an auction, a minimum bid threshold for postponing the end time for concluding the auction, and a number of extensions allowed, the minimum bid threshold representing a total number of a plurality of bids that must be received within a predetermined time of the auction end time;
    receiving bids from remote bidders at the exchange server via a distributed computing network;

dynamically updating the minimum bid threshold with the exchange server as the auction is conducted and based on a number of bids received from the remote bidders;

measuring with the exchange server a rate at which incoming bids are received;

in response to the measured rate of incoming bids exceeding the minimum bid threshold and a number of extensions not exceeding the maximum number of extensions allowed, automatically extending the duration of the auction with the exchange server and setting a new auction end time with the exchange server; and notifying auction participants of the new auction end time with the exchange server.

16. The method of claim 15 further comprising:

measuring with the exchange server said rate at which incoming bids are received during a predetermined time before the end of said auction.

17. The method of claim 15, wherein said minimum bid threshold is dynamically adjustable during said auction.

18. The method of claim 15, wherein said minimum bid threshold is set prior to the start of said auction.

* * * * *

UNITED STATES PATENT AND TRADEMARK OFFICE
CERTIFICATE OF CORRECTION

| | | |
|---|---|---|
| PATENT NO. | : 7,734,505 B2 | Page 1 of 1 |
| APPLICATION NO. | : 09/924671 | |
| DATED | : June 8, 2010 | |
| INVENTOR(S) | : Kevin Miller et al. | |

It is certified that error appears in the above-identified patent and that said Letters Patent is hereby corrected as shown below:

On the Title Page
Insert Item (60):

-- Related U.S. Application Data
(60) Provisional application No. 60/266,968, filed on Jun. 8, 2003. --

Column 1, after the title of the invention, line 6 should be:

The present application claims benefit under 35 USC 119(e) of U.S. Provisional Application No. 60/266,968, filed February 6, 2001, entitled "Method and system for implementing automatic auction extensions and adjustable bid increments in an electronic exchange," the entire contents of which are incorporated herein by reference for all purposes.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,734,505 B2 | Page 1 of 1 |
| APPLICATION NO. | : 09/924671 | |
| DATED | : June 8, 2010 | |
| INVENTOR(S) | : Kevin Miller et al. | |

It is certified that error appears in the above-identified patent and that said Letters Patent is hereby corrected as shown below:

On the Title Pg, Item (57), in "Abstract", line 18, after "subsequent bid" delete "subsequent bid".

In column 11, line 39, in claim 1, delete "minimum" and insert -- a minimum --, therefor.

In column 12, line 44, in claim 10, delete "staff" and insert -- start --, therefor.

Signed and Sealed this
Twenty-sixth Day of July, 2011

David J. Kappos
*Director of the United States Patent and Trademark Office*